E. LA VALLEE.
SHUTTLE.
APPLICATION FILED MAR. 2, 1914.

1,154,420.

Patented Sept. 21, 1915.

Witnesses
M. G. Crozier
E. C. Murphy

Inventor
Emmanuel LaVallee
By Henry J. Miller
  atty.

UNITED STATES PATENT OFFICE.

EMMANUEL LA VALLEE, OF PAWTUCKET, RHODE ISLAND, ASSIGNOR TO LORRAINE MANUFACTURING COMPANY, A CORPORATION OF RHODE ISLAND.

SHUTTLE.

1,154,420.

Specification of Letters Patent. Patented Sept. 21, 1915.

Application filed March 2, 1914. Serial No. 821,969.

*To all whom it may concern:*

Be it known that I, EMMANUEL LA VALLEE, a citizen of the United States, residing at Pawtucket, in the county of Providence and State of Rhode Island, have invented certain new and useful Improvements in Shuttles, of which the following is a specification, reference being had to the accompanying drawings, forming part thereof.

This invention has reference to improvements in shuttles for looms and has for one of its objects the simplification of the spindle holding device and the elimination from the shuttle of transversely extending pins or devices which have heretofore been employed to engage the end of the spindle and which, from their extension through the shuttle, have caused the cutting or wearing of the reed.

Another object of the invention is to so construct a spindle holder for a shuttle that all of its parts may be contained within the body of the shuttle and confined between imperforate walls whereby its parts cannot move laterally to any considerable degree or reach such a position that they can interfere with any related parts of a loom in which the shuttle is used.

Another object of the invention is to simplify the construction of spindle holders for shuttles and to reduce the cost of assembling the same with the shuttle body.

Other objects of the invention will appear from the following description.

The invention consists in the improved spindle holder for shuttles.

The invention also consists in such other novel features of construction and combinations of parts as shall hereinafter be more fully described and pointed out in the claim.

Figure 1:
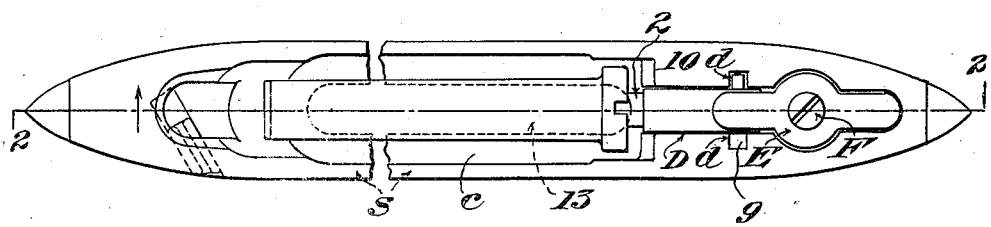
Figure 2:
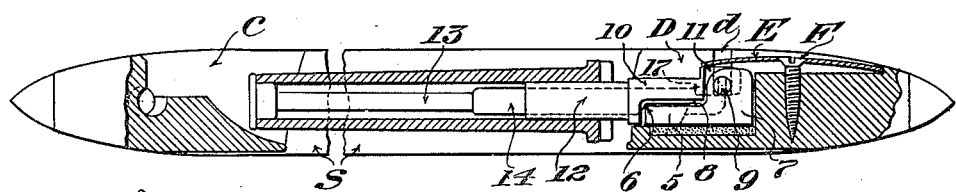
Figure 3:
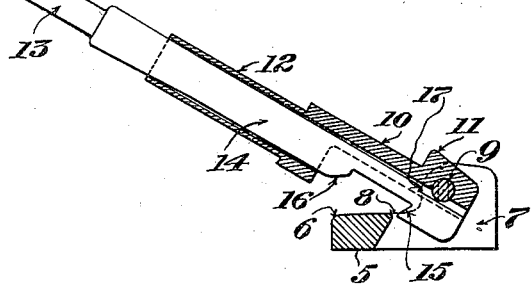

Figure 1, represents a plan view of the improved shuttle parts of the same being broken away. Fig. 2, represents a sectional view of the shuttle taken on line 2—2 Fig. 1, the spindle holder and spindle being shown in full. Fig. 3, represents an enlarged detail view of the spindle and its holder removed from the shuttle, the spindle holder being shown in section as on line 2—2 Fig. 1 and said holder and the spindle being in position to release said spindle.

Similar characters of reference designate corresponding parts throughout.

Shuttles of the nature herein referred to as heretofore constructed comprise a shuttle body having a bobbin receiving cavity and at one end of said cavity a tubular member or socket pivotally mounted within the cavity of the shuttle by a pin driven into a transverse hole or perforation in the shuttle body. Above and below the median line of said socket member other transverse holes were formed in the body of the shuttle and in said holes were located pins which were adapted to engage members of the spindle when said spindle was inserted in the socket member and swung down into the cavity of the shuttle. Said holding pins were merely frictionally held in place, and on account of vibration, often became loose enough to work outward to positions where their ends could cut or wear the reed of a loom on which said shuttles were used. Another cause contributing to the objection of such pins is that from time to time it is or may be necessary to plane down or refinish the sides of the shuttle thus removing a portion of the wood between the point at which the outer ends of pins are positioned and the side face of the shuttle so that comparatively slight longitudinal movement of one of said pins will bring its end to project beyond the side of the shuttle. When it became necessary to remove the spindle holder from the shuttle it was necessary to drive out at least one of said pins.

In carrying this invention into practice I take a shuttle body S having the bobbin receiving cavity C furnished with the holder receiving recess D and in the side walls of the recess D I provide the grooves or channels $d$, $d$. The usual bearing plate E is also provided whcih is secured in place at the upper or open side of the shuttle by the screw F so that one of the arms of said plate extends over the recess D.

The spindle holder comprises the base 5 having the cam shoulder 6 and side plates 7, 7 between which is the bevel edge or locking shoulder 8. Pivotally mounted between the plates 7, 7 by means of the pin 9, which preferably extends considerably beyond the outer sides of said plates, is the socket member 10 having the cam shoulder 11 and the tubular member 12 having its inner end spaced from the pin 9 sufficiently to clear the cam shoulder 6 of the base 5 so that said socket member 10 may swing downward to a position approximately in line with said base 5.

The spindle 13 has its shank 14 shaped to be slidably received by the tubular member 12 and furnished near its end with the tooth 15 and with the bevel cam surface 16 spaced from such tooth 15 sufficiently that when the spindle shank 14 is pushed home into said socket member 10 and swung downward with said socket member the bevel surface 16 may ride against shoulder 6, of the spindle holder base thereby effecting the longitudinal movement of the spindle to engage tooth 15 of the spindle shank with the holding edge or stop 8 of the spindle holder base whereby, when the spindle is in the position shown in Fig. 2 the disengagement of the spindle from its holding device is prevented. As shown herein the shank 14 of spindle 13 has the stop 17 which limits the movement of the spindle shank inward in the tubular member 12 by coming in contact with the pin 9 but this stop 17 may be omitted without changing the invention and if the diameter of pin 9 be sufficiently reduced it will not be necessary to cut away any portion of shank 14 to clear said pin 9.

It is preferred to have pin 9 extend beyond the sides 7, 7 of the spindle holder in order that when said pin 9 is engaged in the grooves $d, d$ of the shuttle the longitudinal movement of the holder 5 is prevented but I do not intend to limit my invention in all cases to the use of such connection between the holder 5 and the shuttle.

When the parts are in position as shown in Fig. 2 plate E bears against cam shoulder 11 and resists the upward swinging of the socket member 12 and its spindle, such resistance of plate E may however be overcome and when the spindle 13 reaches the inclined position shown in Fig. 3 said spindle may be drawn out as its tooth 15 will then clear the edge 8 of the holder 5.

Having thus described my invention I claim as new and desire to secure by Letters Patent.

A shuttle having a spindle receiving cavity and a recess extending in line with said cavity and having imperforate side walls having grooves, in combination with a spindle holder removably contained within said recess and cavity and comprising a base having side walls and a locking tooth member, a pin extending through said side walls to engage with said grooves, a socket member pivotally mounted on said pin and having a tubular spindle socket open at its rear end, a spindle slidable in said socket and having a tooth to engage with the locking tooth member at one edge and a cam adapted to ride against said tooth member to effect such engagement between the tooth of said spindle and the tooth member.

EMMANUEL LA VALLEE.

Witnesses:
   JOHN F. TOWNLEY,
   STEPHEN O. MEADER.